United States Patent
Radhakrishnan et al.

(10) Patent No.: US 10,950,875 B1
(45) Date of Patent: Mar. 16, 2021

(54) SOFC SYSTEM AND METHOD TO DECREASE ANODE OXIDATION

(71) Applicant: BLOOM ENERGY CORPORATION, Sunnyvale, CA (US)

(72) Inventors: Vijay Radhakrishnan, Mumbai (IN); Manoj Pillai, Mumbai (IN); Tad Armstrong, Burlingame, CA (US); Padiadpu Shankara Anantha, Mumbai (IN)

(73) Assignee: BLOOM ENERGY CORPORATION, San Jose, CA (US)

(*) Notice: Subject to any disclaimer, the term of this patent is extended or adjusted under 35 U.S.C. 154(b) by 171 days.

(21) Appl. No.: 16/169,275

(22) Filed: Oct. 24, 2018

Related U.S. Application Data

(60) Provisional application No. 62/610,335, filed on Dec. 26, 2017.

(51) Int. Cl.
| | |
|---|---|
| *H01M 8/04014* | (2016.01) |
| *H01M 8/04701* | (2016.01) |
| *H01M 8/04228* | (2016.01) |
| *H01M 8/12* | (2016.01) |
| *H01M 4/90* | (2006.01) |
| *H01M 8/04828* | (2016.01) |
| *H01M 8/124* | (2016.01) |

(52) U.S. Cl.
CPC ..... *H01M 8/04014* (2013.01); *H01M 4/9025* (2013.01); *H01M 8/04228* (2016.02); *H01M 8/04701* (2013.01); *H01M 8/04947* (2013.01); *H01M 8/12* (2013.01); *H01M 2008/1293* (2013.01)

(58) Field of Classification Search
None
See application file for complete search history.

(56) References Cited

U.S. PATENT DOCUMENTS

| | | | |
|---|---|---|---|
| 8,617,763 B2 | 12/2013 | Armstrong et al. | |
| 8,748,056 B2 | 6/2014 | Batawi et al. | |
| 2008/0096080 A1 | 4/2008 | Batawi et al. | |
| 2008/0254336 A1 | 10/2008 | Batawi | |
| 2009/0253007 A1* | 10/2009 | Mergler | H01M 8/0612 429/442 |
| 2011/0039183 A1 | 2/2011 | Armstrong et al. | |
| 2016/0028096 A1* | 1/2016 | Vesely | H01M 8/0618 429/414 |

* cited by examiner

*Primary Examiner* — Wyatt P McConnell
(74) *Attorney, Agent, or Firm* — The Marbury Law Group PLLC

(57) ABSTRACT

A solid oxide fuel cell system and method, the system including a hotbox containing a fuel cell stack, a fuel supply configured to provide a fuel to the fuel cell stack, and a blower configured to provide air to the fuel cell stack. During a shutdown operation, the blower is configured to cool the fuel cell stack at a rate ranging from about 0.75° C./min to about 3.0° C./min, until the temperature of the fuel cell stack is reduced to a temperature at which oxidation of anodes of the fuel cell stack is substantially prevented.

20 Claims, 5 Drawing Sheets

SOFC SYSTEM AND METHOD TO DECREASE ANODE OXIDATION

FIELD

The present invention is generally directed to a solid oxide fuel cell (SOFC) system and a method to decrease anode oxidation during system shutdown.

BACKGROUND OF THE INVENTION

Fuel cells are electrochemical devices which can convert energy stored in fuels to electrical energy with high efficiencies. A solid oxide fuel cell (SOFC) generates electrical energy and reactant product from fuel and oxidizer. The SOFC contains a ceramic electrolyte, a negative or fuel electrode and a positive or oxygen electrode. The electrolyte is usually a doped zirconia ceramic. The negative or fuel electrode (referred hereto as the "anode" electrode) may be made from a cermet, such as a nickel-yttria stabilized zirconia ("YSZ") cermet. The positive or oxygen electrode (referred hereto as the "cathode" electrode) is usually made of a ceramic perovskite material, such as lanthanum strontium manganite ("LSM") having a formula $(La,Sr)MnO_3$ or lanthanum strontium cobaltite ("LSCo") having a formula $(La,Sr)CoO_3$. Furthermore, contact layers, such as a Ni or nickel oxide anode contact layer and an LSM or LSCo cathode contact layer may be formed on the anode and cathode electrodes, respectively. The SOFC is usually part of a system that includes electrically connected fuel cells and other components, such as gas separator/interconnect plates, seals, and electrical contacts. Each gas separator/interconnect plate contacts the electrode and/or current collector layer of adjacent fuel cells.

SUMMARY

According to various embodiments, provided is solid oxide fuel cell (SOFC) system, comprising: a hotbox comprising a fuel cell stack; a fuel supply configured to provide a fuel to the fuel cell stack; and a blower configured to provide air to the fuel cell stack, wherein, during a shutdown operation, the blower is configured to cool the fuel cell stack at a rate ranging from about 0.75° C./min to about 3.0° C./min.

According to various embodiments, provided is a solid oxide fuel cell (SOFC) system, comprising: a hotbox comprising a fuel cell stack; a fuel supply configured to provide a fuel to the fuel cell stack; a blower configured to provide air to the fuel cell stack; and a controller configured to control the blower, wherein, during a shutdown mode, the controller is configured to control the blower, such that the blower provides air to the fuel cell stack, until the temperature of the fuel cell stack is reduced to a temperature at which oxidation of anodes of the fuel cell stack is substantially prevented.

According to various embodiments, provided is a method of operating a solid oxide fuel cell (SOFC) system comprising a fuel cell stack, the method comprising: operating the SOFC system in a steady-state mode; and operating the SOFC system in a shutdown mode comprising: stopping fuel flow to the fuel cell stack; and actively cooling the fuel cell stack until the temperature of the fuel cell stack is decreased to a temperature at which oxidation of anodes of the fuel cell stack is substantially prevented.

DETAILED DESCRIPTION OF THE EXEMPLARY EMBODIMENTS

The accompanying drawings, which are incorporated herein and constitute part of this specification, illustrate example embodiments of the invention, and together with the general description given above and the detailed description given below, serve to explain the features of the invention.

The term "fuel cell stack," as used herein, means a plurality of stacked fuel cells which share a common fuel inlet and exhaust passages or risers. The "fuel cell stack," as used herein, includes a distinct electrical entity which contains two end plates which are connected to power conditioning equipment and the power (i.e., electricity) output of the stack. Thus, in some configurations, the electrical power output from such a distinct electrical entity may be separately controlled from other stacks. The term "fuel cell stack" as used herein, also includes a part of the distinct electrical entity, such as a fuel cell column including multiple fuel cell stacks.

Figure 1:
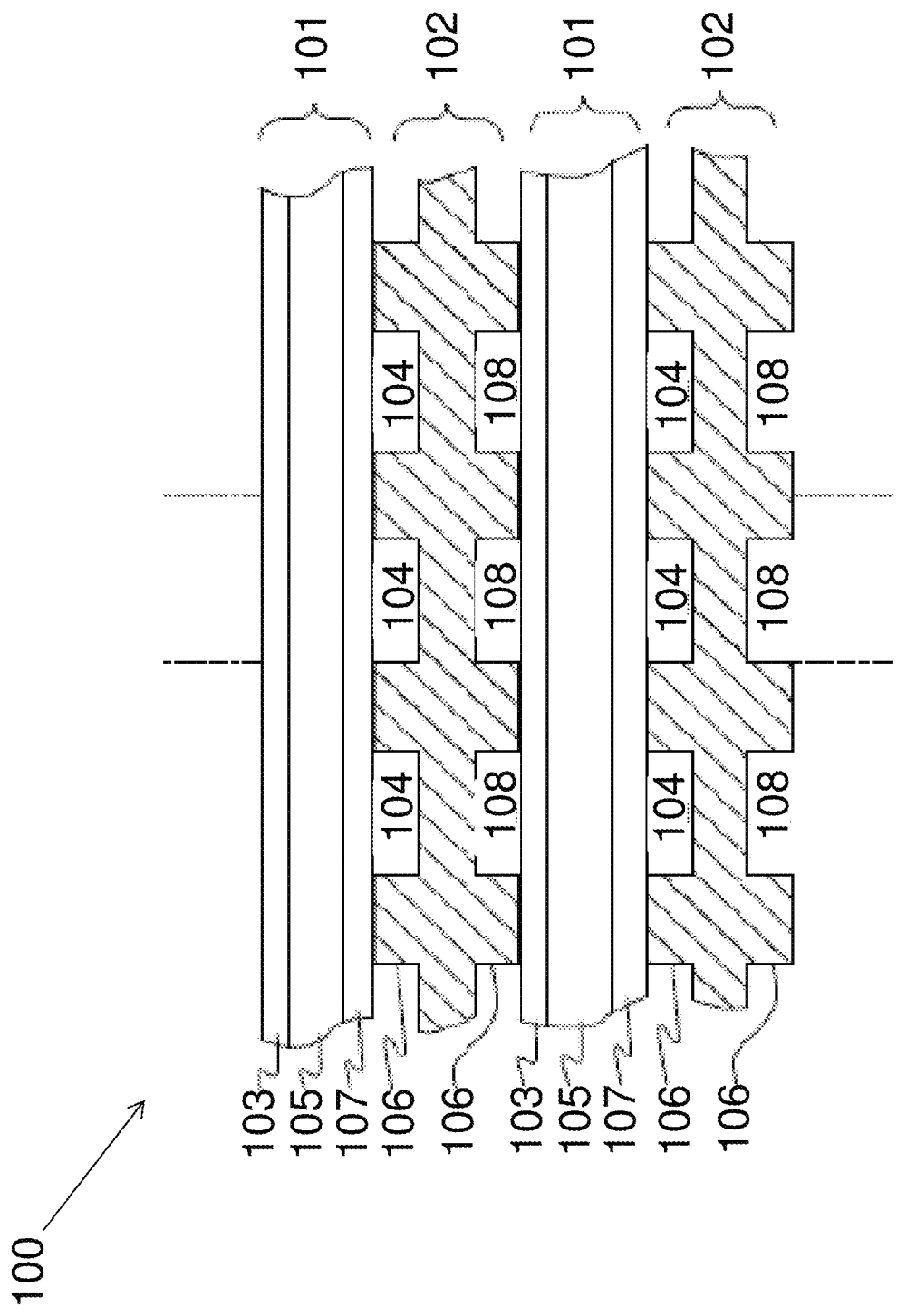
FIG. 1 is a schematic side cross-sectional view of an exemplary SOFC stack.

FIG. 1 is a side cross-sectional view of an exemplary SOFC stack 100. The stack 100 includes fuel cells 101 that are separated by interconnects 102. Each fuel cell 101 comprises a solid oxide electrolyte 105 disposed between an anode 103 and a cathode 107. Fuel cell stacks are frequently built from a multiplicity of SOFC's 101 in the form of planar elements, tubes, or other geometries. Fuel and air has to be provided to the electrochemically active surface, which can be large.

Each interconnect 102 includes ribs 106 that at least partially define air channels 104 and fuel channels 108. In particular, the air channels 104 are configured to provide an oxidant, such as air, to the anode 107 of an adjacent fuel cell 101, and the fuel channels 108 are configured to provide a hydrocarbon fuel to the cathode 103 of an adjacent fuel cell 101. The interconnects 102 may separate the air and fuel flows. The interconnects 102 may also include an electrically conductive material and may be configured to electrically connect adjacent fuel cells 101. At either end of the stack 100, there may be an air end plate or fuel end plate (not shown) for providing air or fuel, respectively, to the end fuel cells 101.

The anodes 103 are usually fabricated from a nickel based ceramic-metal (cermet) mixtures. The cermet mixtures include nickel—doped ceria (e.g., samaria doped ceria), nickel—stabilized zirconia (e.g., scandia or yttria stabilized zirconia), nickel—doped ceria and stabilized zirconia, etc. cermets, such as the cermets described in U.S. Pat. Nos. 8,748,056 and 8,617,763 and U.S. Published Application Number US 2008-0254336 A1, incorporated herein by reference in their entirety. For proper SOFC operation, the metallic component of these anodes 103 is kept reduced. When the metallic component oxidizes (i.e., is converted from a metal to a metal oxide), the electrical conductivity of the anode 103 drops by several orders of magnitude and the anode 103 must be re-reduced (i.e., converted back to a metal by an anneal in a reducing ambient or by electrochemical reduction) to properly operate.

Many anodes 103 are unable to withstand oxidation-reduction cycles at all because they delaminate from the electrolyte during the cycles due to the volume changes of its constituents. Although carefully engineered cermets may at least partially avoid a significant volume change during the oxidation and reduction cycles, and thereby provide a degree of oxidation-reduction cycling capability, they nonetheless may experience significant permanent performance degradation after the oxidation-reduction cycle.

An important operating challenge for SOFC systems are "emergency stops" in which the SOFC system is suddenly shut down (i.e., stops generating electricity) and is left to cool down without active control or intervention. An emergency stop may be caused by a number of factors, such as a failure of a system component (e.g., a failure of an air and/or fuel blower or pump, failure of fuel piping, failure of stack components, etc.), interruption in the supply of fuel or air to the system, failure or disconnection of an electrical load, activation of an emergency shutdown in case of an environmental emergency (e.g., earthquake, tornado, hurricane, etc.) or electrical overload, etc. The emergency stop may be intentionally activated by the system computer controller or by a human operator in response to a system condition (e.g., component failure, disruption of fuel or air supply, etc.) or the emergency stop may occur unintentionally due to an unforeseen event. During an emergency stop, anode oxidation occurs as air slowly enters the anode side of each fuel cell by diffusion along the fuel plumbing (e.g., from the fuel inlet or outlet conduits after fuel flow to the system is stopped during the emergency stop), while stack temperatures slowly decrease due to conductive and natural convection heat loss.

When the SOFC system is restarted, anode reduction may occur. Accordingly, every uncontrolled SOFC system shutdown can have an associated oxidation and re-reduction cycle (redox cycle). Multiple redox cycles during system operation potentially damages anode microstructure, which may result in performance reduction. For example, Ni may be agglomerated within anodes due to the redox cycles, resulting in performance reduction.

The present inventors realized that anode oxidation occurs while anodes cool from steady-state SOFC operating temperatures (e.g., 750° C. to 900° C.) to a temperature ranging from about 575° C. to about 625° C., such as a temperature of about 600° C., and are exposed to an oxidizing environment (e.g., infiltrating air). As such, a decrease in the amount of time anodes are exposed to an oxidizing environment at temperatures above about 600° C. provides for a corresponding decrease in anode oxidation.

According to various embodiments, provided is a SOFC system and method configured to reduce anode degradation by actively cooling a fuel cell stack. In particular, during a shutdown mode of the SOFC system, such as a controlled shutdown mode or an emergency shutdown mode, fuel flow to the anode side of a fuel cell is stopped. Since the fuel contributes to the production of a reducing anode environment, the lack of fuel may result in an oxidizing anode environment.

Therefore, the present disclosure provides methods of minimizing anode oxidation during system shutdown, which may improve redox stability of system anodes. In particular, the present disclosure provides methods of actively cooling a fuel cell stack during system shutdown, from an operating temperature to a temperature of less than about 600° C. The active cooling may reduce an amount of time system anodes are at temperatures at which Ni oxidation occurs.

Figure 2:
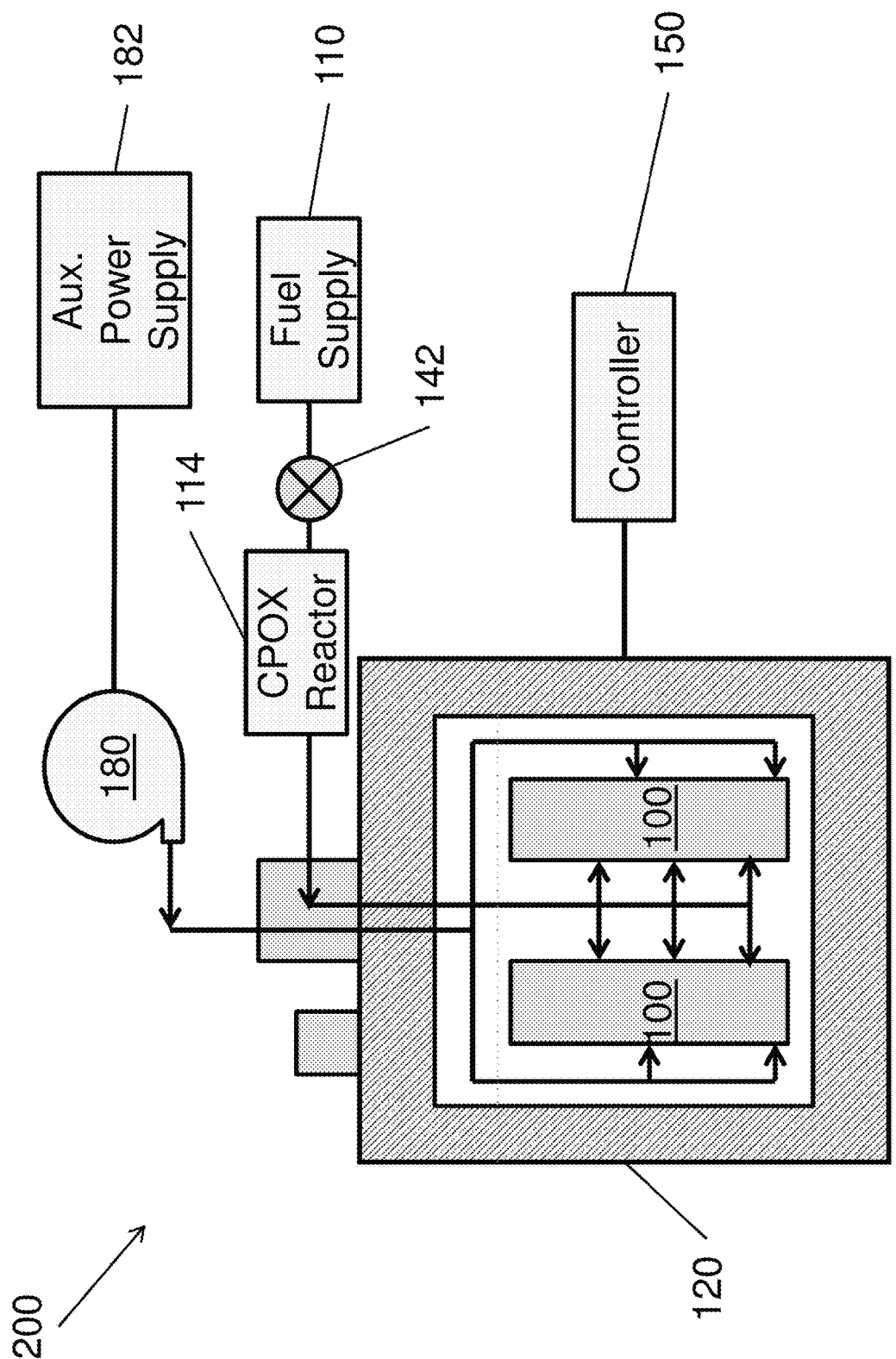
FIG. 2 is a schematic of a SOFC system, according to various embodiments of the present disclosure.

FIG. 2 is a block diagram of a SOFC system 200, according to various embodiments of the present disclosure. Referring to FIG. 2, the system 200 may include a fuel supply 110, a fuel valve 142, a hotbox 120 including one or more SOFC stacks 100, a controller 150, and a blower 180. The system 200 may optionally include an auxiliary power supply or source 182, and a catalytic partial oxidation (CPOX) reactor 114.

The hotbox 120 may include a thermally insulated housing configured to maintain the stacks 100 at an operating temperature. The fuel valve 142 may be configured to control fuel flow from the fuel supply 110 to the hotbox 120. The fuel supply 110 may include hydrogen or a hydrocarbon fuel and may be a natural gas line or a gas storage vessel. During steady-state operation, the fuel valve 142 may be open, such that the fuel may be provided to anode electrodes of the fuel cell stacks 100. During system shutdown, the fuel valve 142 may be closed. For example, during normal shutdown operations, the fuel valve 142 may remain open for a period of time before closing, such that an anode reducing environment may be maintained while the fuel cell stacks 100 cool. During an emergency shutdown, the fuel valve may close, such that the supply of fuel is stopped before the stacks have cooled.

The CPOX reactor 114 may operate during system startup to partially oxidize the fuel provided from the fuel supply 110. However, the present disclosure is not limited to any particular type of fuel or fuel supply configuration. For example, the fuel supply 110 may be a hydrogen tank and may not include a CPOX reactor.

The blower 180 may be any type of device, such as a fan, air pump, or air compressor, configured to provide a gas such as air to the hotbox 120. In particular, during steady-state operation, the blower may be configured to force air though air channels of interconnects between the fuel cells of the stacks 100, such that air is provided to the cathode electrodes of the fuel cells.

During shutdown operations, the blower 180 may be configured to continue to provide air to the hotbox 120 until the stacks 100 have cooled to a selected temperature. For example, according to various embodiments, during shutdown operations, the blower 180 may provide air to the hotbox 120, until one or more of the fuel cell stacks 100 have cooled from an operating temperature as discussed above (e.g., above 750° C.) to a temperature of about 600° C. or less. Accordingly, the blower may be configured to decrease a cooling time of the fuel cell stacks 100, such that nickel oxidation in the anode electrodes is decreased.

The speed of the blower 180 (e.g., the air flow rate to the fuel cell stacks 100) may be set to provide a particular cooling rate. For example, the speed of the blower 180 may be set to provide a stack cooling rate of from about 0.75 to about 3.0° C./min, such as from about 1 to about 2° C./min, or about 1.5° C./min. If the cooling rate is above this range, excessive thermal stress may occur in the stacks 100 and/or other system components, which may result in system failure. In addition, if the cooling rate is too high, system temperatures may be reduced to the point that system down time is excessively increased, due to increased down time during reheating. If the cooling rate is too low, nickel oxidation may not be sufficiently reduced.

During shutdown operations, the blower 180 may be turned off once the fuel cell stacks 100 are cooled to a selected temperature. For example, the selected temperature may be a temperature at which the oxidation of an anode material, such as nickel, is reduced or prevented. In particular, since the rate of nickel oxidation is significantly reduced at temperatures of below about 600° C., the blower 180 may be operated until the fuel cell stacks 100 are cooled to a temperature of from about 575° C. to about 625° C., such as about 600° C. The blower 180 may then be shut off, and the fuel cell stacks 100 may then be passively cooled. However, in some embodiments, the blower may be used to cool the fuel cell stacks 100 to temperatures below 600° C. For example, if system maintenance or repair is needed, the blower 180 may be kept on until the system 200 and/or one or more of the stacks 100 are cooled to room temperature, for example.

In some embodiments, the blower 180 may be operated using power from the SOFC system, such as power generated by the fuel cells of the stacks 100. However, the SOFC system 200 may include the auxiliary power supply 182 to provide power to the blower 180 when power cannot be provided by the fuel cells. For example, the auxiliary power supply 182 may be used during a complete system shutdown. The auxiliary power supply 182 may include connection to the power grid. In other embodiments, the auxiliary power supply 182 may include one or more energy storage devices, such as batteries, configured to store power generated by the fuel cell stacks 100.

The controller 150 may be configured to control various elements of the system 200, such as the blower 180, the valve 142, the auxiliary power supply 182, and/or the CPOX reactor 114, during startup, steady-state, and/or shutdown operations of the system 200. For example, the controller 150 may be configured to operate a CPOX blower to provide air to the CPOX reactor 114 during startup operations, and may turn off the CPOX blower during steady-state operations. However, one or more of these elements may be operated manually. Further, one or more of these elements may operate automatically (e.g., without receiving power and/or control signals), during at least the shutdown of the system 200.

If a SOFC system, such as the system 200, is operated at low current holds for extended periods of time, fuel cell stacks may develop corresponding weaknesses. The present inventors have discovered that shut down operations, including the application of the above active cooling, unexpectedly improves the robustness of such fuel cell stacks.

Although various components in FIG. 2 are shown as being disposed outside of the hotbox 120, the present disclosure is not limited thereto. In particular, various components and conduits may be disposed inside of the hotbox 120. For example, the CPOX reactor 114, the controller 150, the blower 180, and/or the auxiliary power supply 182 may be disposed on or in the hotbox 120.

Figure 3:
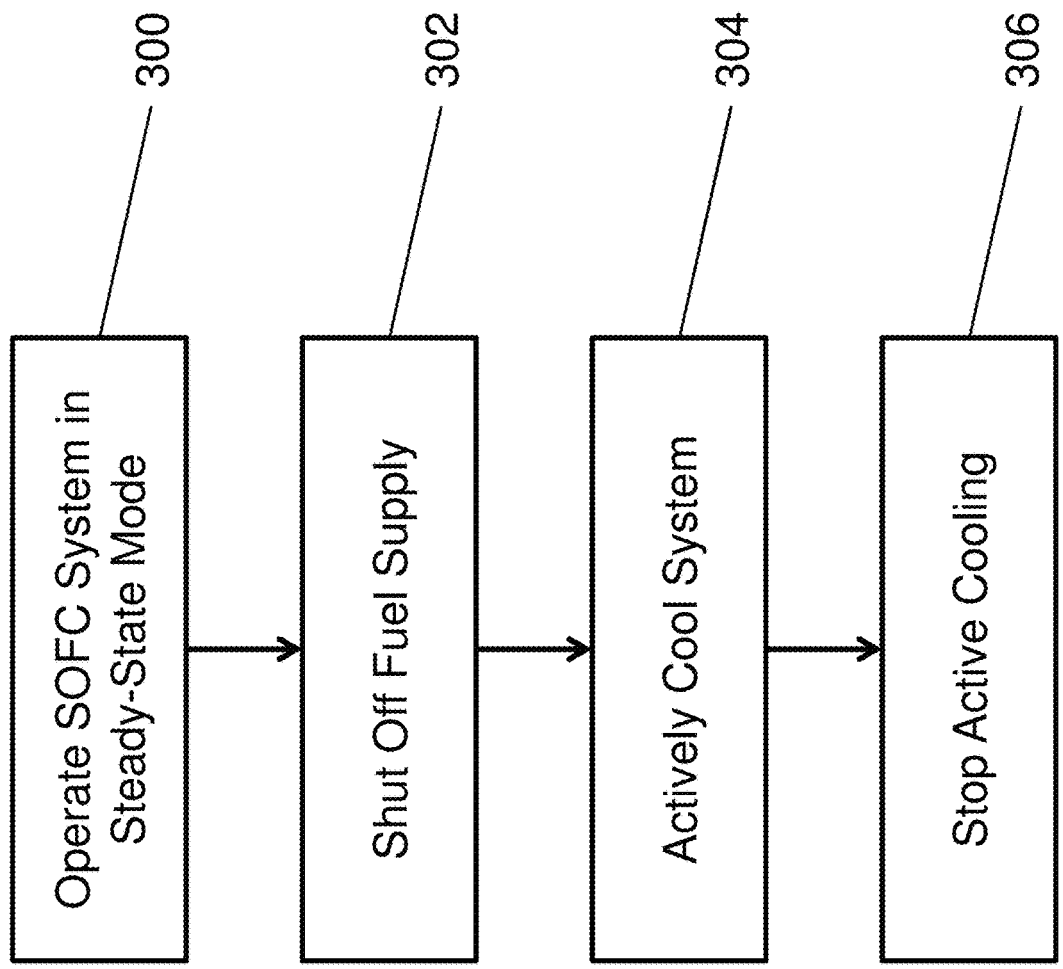
FIG. 3 is a block diagram illustrating a method of reducing anode oxidation, according to various embodiments of the present disclosure.

FIG. 3 is a block diagram illustrating a method of decreasing anode oxidation during shut-down operations, according to various embodiments of the present disclosure. Referring to FIG. 3, in step 300, a SOFC system, such as the system of FIG. 2, is operated in a steady-state mode, as noted above.

In response to an external or internal signal, the SOFC system may enter a shutdown mode. In particular, in operation 302 a fuel supply to fuel cell stacks included in the SOFC system may be shut off. In operation 304, the fuel cell stacks may be actively cooled using air flow provided by a blower. In particular, as described above, the flow rate of the blower may be set to provide a stack cooling rate of from about 0.75 to about 3.0° C./min, such as from about 1 to about 2° C./min, or about 1.5° C./min.

The active cooling may continue until the fuel cell stacks reach a designated temperature. In particular, as described above, the fuel cell stacks may be actively cooled until reaching a temperature where anode oxidation is substantially reduced or prevented, such as a temperature of about 600° C.

In step 306, the active cooling may be stopped once the designated temperature is reached. In particular, the blower may be stopped and the fuel cell stacks may passively cool.

Figure 4:
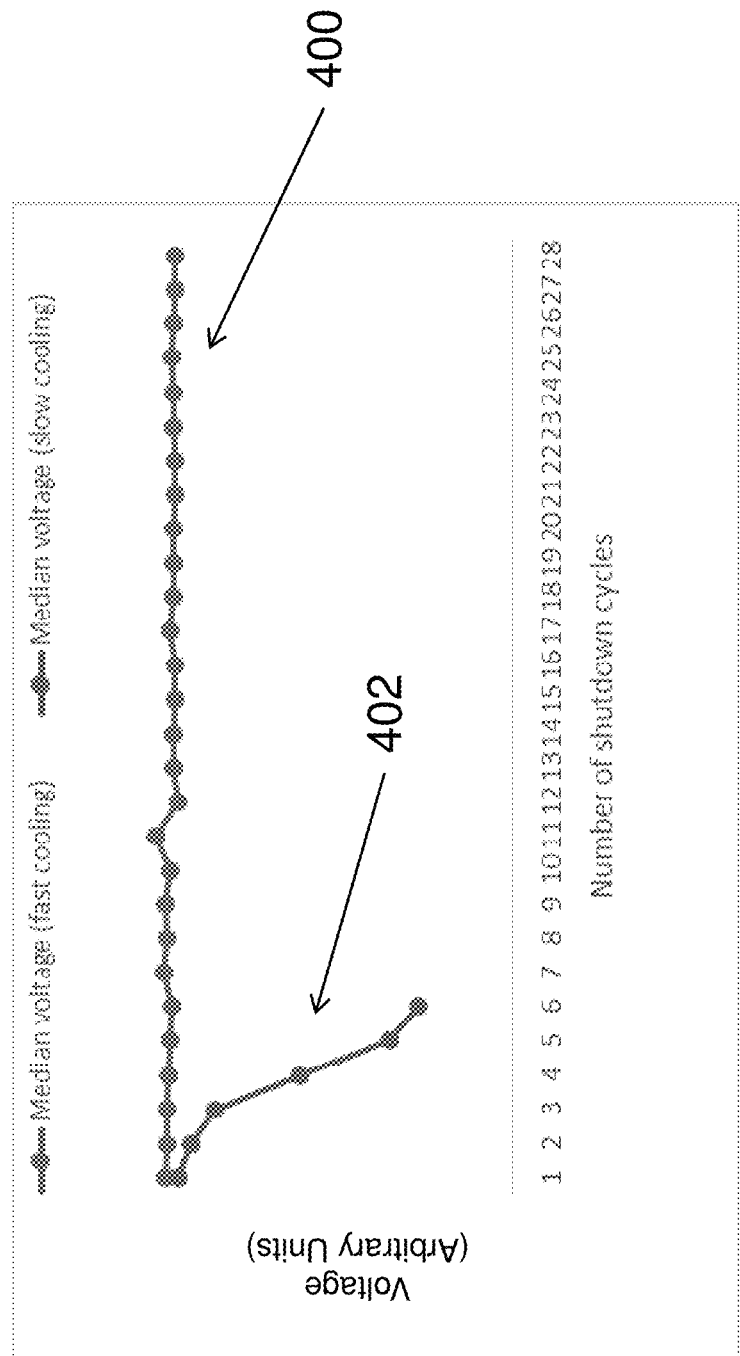
FIG. 4 is a graph showing median voltages of comparative and exemplary fuel cell stacks over multiple redox cycles, according to various embodiments of the present disclosure.

FIG. 4 is a graph illustrating the median voltage of fuel cell stacks that were subjected to a number of redox (e.g., shutdown/restart) cycles. In particular, line 400 shows the median voltage of an exemplary fuel cell stack that was actively cooled until reaching 600° C. (1.5° C./min cooling rate) during shutdown, and line 402 shows the median voltage of a comparative fuel cell stack that was not actively cooled (0.3° C./min cooling rate) during shutdown. As can be seen in FIG. 4, the median voltage of the comparative fuel cell stack dropped significantly after 6 redox cycles, while the exemplary fuel cell stack maintained a substantially constant median voltage for 28 redox cycles.

Figure 5A:
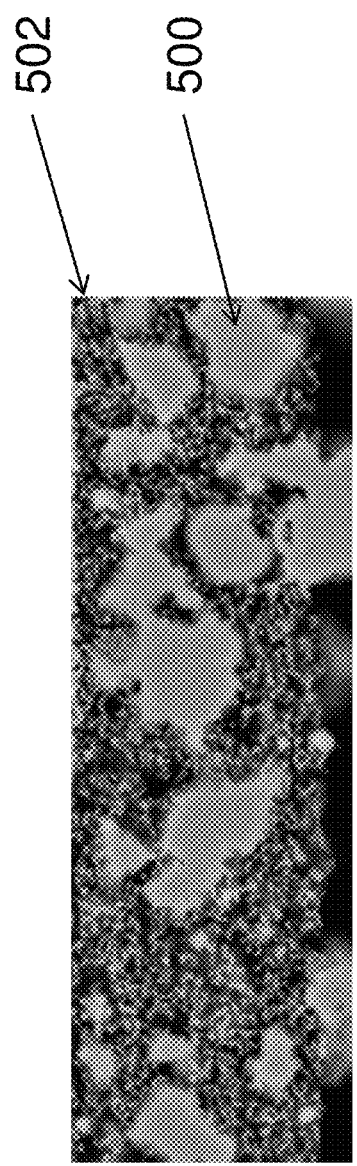
FIGS. 5A and 5B are micrographs of anodes respectively subjected to comparative redox cycles and exemplary redox cycles including active cooling.
Figure 5B:
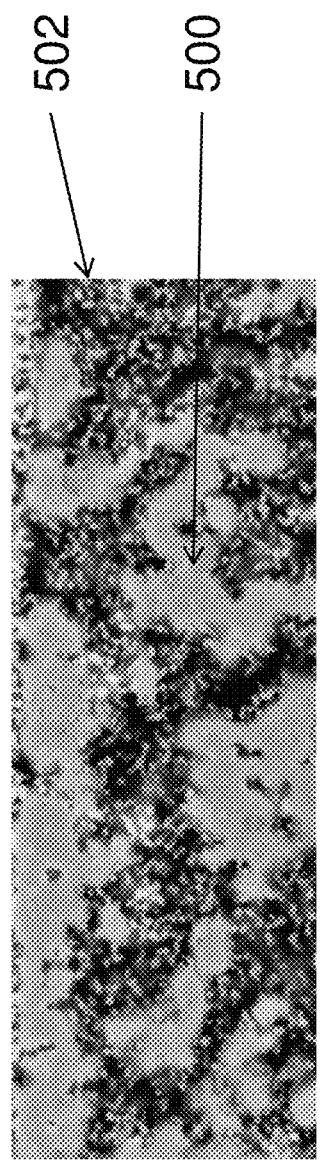

FIG. 5A is a micrograph showing nickel aggregation in a segregated Ni network of an anode after 10 redox cycles that did not include active cooling (e.g., fuel cell stacks were passively cooled). FIG. 5B is a micrograph showing Ni aggregation in a segregated Ni network of an anode after 27 redox cycles that included active cooling at 1.5° C./min, until reaching 600° C.

As can be seen in FIG. 5A, the passively cooled anode included aggregations of nickel 500 that were not well dispersed in a ceramic material 502. In contrast, the actively cooled anode of FIG. 5B included nickel 500 that was more evenly distributed within the ceramic material 502. Further, the active cooling also maintained the anode structure over a significantly higher number of redox cycles.

The foregoing description of the invention has been presented for purposes of illustration and description. It is not intended to be exhaustive or to limit the invention to the precise form disclosed, and modifications and variations are possible in light of the above teachings or may be acquired from practice of the invention. The description was chosen in order to explain the principles of the invention and its practical application. It is intended that the scope of the invention be defined by the claims appended hereto, and their equivalents.

What is claimed is:

1. A solid oxide fuel cell (SOFC) system, comprising:
   a hotbox comprising a fuel cell stack;
   a fuel supply configured to provide a fuel to the fuel cell stack;
   a fuel valve configured to control fuel flow from the fuel supply to the fuel cell stack; and
   a blower configured to provide air to the fuel cell stack, wherein, during a shutdown mode:
      the blower is configured to cool the fuel cell stack at a rate ranging from about 0.75° C./min to about 3.0° C./min; and
      the fuel valve is configured to prevent fuel flow from the fuel supply to the fuel cell stack, such that an anode reducing environment is not maintained during the shutdown mode.

2. The system of claim 1, wherein the blower is configured to stop cooling the stack once the fuel cell stack is cooled from a steady-state operating temperature to a temperature ranging from about 575° C. to about 625° C.

3. The system of claim 2, wherein the blower is configured to stop cooling the stack once the fuel cell stack is cooled to a temperature of about 600° C.

4. The system of claim 1, wherein the blower is configured to cool the fuel cell stack at a rate ranging from about 1.0° C./min to about 2.0° C./min.

5. The system of claim 1, further comprising an auxiliary power supply configured to provide power to the blower during the shutdown operation.

6. The system of claim 5, wherein the auxiliary power supply comprises a battery, a connection to a power grid, or a combination thereof.

7. The system of claim 1, further comprising a controller configured to control the operation of the blower and the fuel cell stack.

8. The system of claim 1, wherein the blower is configured to cool the fuel cell stack by providing air through air channels of interconnects to cathode electrodes of fuel cells of the fuel cell stack.

9. A solid oxide fuel cell (SOFC) system, comprising:
a hotbox comprising a fuel cell stack;
a fuel supply configured to provide a fuel to the fuel cell stack;
a blower configured to provide air to the fuel cell stack;
a fuel valve configured to control fuel flow from the fuel supply to the fuel cell stack; and
a controller configured to control the blower,
wherein, during a shutdown mode, the controller is configured to:
control the blower, such that the blower provides air to the fuel cell stack, until the temperature of the fuel cell stack is reduced to a temperature at which oxidation of anodes of the fuel cell stack is substantially prevented; and
control the fuel valve to prevent fuel flow from the fuel supply to the fuel cell stack, such that an anode reducing environment is not maintained during the shutdown mode.

10. The system of claim 9, wherein during the shutdown mode, the controller is configured to shut off the blower once the fuel cell stack is cooled from a steady-state operating temperature to a temperature ranging from about 575° C. to about 625° C.

11. The system of claim 10, wherein during the shutdown mode, the controller is configured to stop the blower once the fuel cell stack is cooled to a temperature of about 600° C.

12. The system of claim 9, wherein during the shutdown mode, the controller is configured to control the speed of the blower, such that the blower cools the fuel cell stack at a rate ranging from about 1.0° C./min to about 2.0° C./min.

13. A method of operating a solid oxide fuel cell (SOFC) system comprising a fuel cell stack, the method comprising:
operating the SOFC system in a steady-state mode; and
operating the SOFC system in a shutdown mode comprising:
stopping fuel flow to the fuel cell stack such that an anode reducing environment is not maintained during the shutdown mode; and
actively cooling the fuel cell stack until the temperature of the fuel cell stack is decreased to a temperature at which oxidation of anodes of the fuel cell stack is substantially prevented.

14. The method of claim 13, wherein the actively cooling the fuel cell stack comprises using a blower to provide air to the fuel cell stack.

15. The method of claim 14, wherein the actively cooling the fuel cell stack comprises using the blower to cool the fuel cell stack a rate ranging from about 0.75° C./min to about 3.0° C./min.

16. The method of claim 14, wherein the actively cooling the fuel cell stack comprises using the blower to cool the fuel cell stack a rate ranging from about 1.0° C./min to about 2.0° C./min.

17. The method of claim 13, wherein the actively cooling the fuel cell stack comprises using a blower to provide air to the fuel cell stack until the temperature of the fuel cell stack is decreased from a steady-state operating temperature to a temperature ranging from about 575° C. to about 625° C., and then stopping the blower.

18. The method of claim 13, wherein the actively cooling the fuel cell stack comprises using a blower to provide air to the fuel cell stack, until the temperature of the fuel cell stack is decreased from a steady-state operating temperature to a temperature ranging of about 600° C., and then stopping the blower.

19. The method of claim 14, wherein the blower provides air to the fuel cell cathodes during the steady-state mode.

20. The method of claim 19, wherein the method further comprises:
powering the blower using power generated by the fuel cell stack during the steady-state mode; and
powering the blower using an auxiliary power source during the shutdown mode.

* * * * *